United States Patent [19]

Zimmermann

[11] Patent Number: 4,616,758

[45] Date of Patent: Oct. 14, 1986

[54] INSULATING CONTAINER, IN PARTICULAR INSULATING BOTTLE

[75] Inventor: Anso Zimmermann, Bad Hersfeld, Fed. Rep. of Germany

[73] Assignee: Rotpunkt Dr. Anso Zimmermann, Niederaula, Fed. Rep. of Germany

[21] Appl. No.: 704,633

[22] Filed: Feb. 22, 1985

[30] Foreign Application Priority Data

Mar. 7, 1984 [DE] Fed. Rep. of Germany ... 8407009[U]

[51] Int. Cl.⁴ .............................................. A47J 41/00
[52] U.S. Cl. .................................... 215/13 R; 220/69
[58] Field of Search ............... 215/13 R, 12 R, 100 R; 220/69, 66, 76

[56] References Cited

U.S. PATENT DOCUMENTS

| | | | |
|---|---|---|---|
| 2,565,793 | 8/1951 | Weismantel | 220/69 |
| 2,628,840 | 2/1953 | Laube, Jr. | 220/69 |
| 3,705,661 | 12/1972 | Davis | 215/13 R |
| 3,722,725 | 3/1973 | Khetani et al. | 220/69 |
| 3,813,757 | 6/1974 | Bell | 215/13 R |
| 3,963,226 | 6/1976 | Jankowski, Jr. | 220/69 |
| 3,978,233 | 8/1976 | Bolt | 215/13 R |

FOREIGN PATENT DOCUMENTS 215006 10/1984 German Democratic Rep. .

Primary Examiner—Joseph Man-Fu Moy
Attorney, Agent, or Firm—Scully, Scott, Murphy and Presser

[57] ABSTRACT

The invention relates to an insulating container (1), in particular an insulating flask, with a vacuum glass insert (2) and a hollow cylindrical housing (3) surrounding the latter. Housing (3) consists of an upper part (4) and a lower part (5) which are screwed together, the upper part (4) having an outer screw thread (6) and the lower part (5), in the form of a base with a raised-up edge, having an inner screw thread (8). To cope with different lengths of vacuum glass inserts (2) within a tolerance range the screw thread (6) is made sufficiently long to enable all such inserts to be held firmly between a shoulder (9) in the upper part (4) and a thrust or support piece 12 in the lower part (5). The edge of the housing lower part (5) is provided with a one-piece extension which overlaps the housing upper part (4) beyond the screw thread (6) to form a cover ring (28) for any unused area of the screw thread (6).

3 Claims, 2 Drawing Figures

INSULATING CONTAINER, IN PARTICULAR INSULATING BOTTLE

TECHNICAL FIELD OF THE INVENTION

The subject matter of the invention is an insulating container according to the preamble of claim 1.

BRIEF DESCRIPTION OF THE PRIOR ART

An insulating container of this type of construction is described and portrayed in DE-OS No. 24 47 072. In the case of the known embodiment, the housing's upper part is provided—on a section, reduced in diameter—with an outer screw thread, onto which the housing's lower part, which has an inner screw thread, can be screwed. The screwing together does not just serve to fix the housing parts to one another, but also serves, in addition, to hold the vacuum glass insert between the housing parts, whereby clear differences in the length of the vacuum glass insert and also in the length of the housing parts must be taken into account. The arrangement is, therefore, designed in such a way that, in the case of average tolerance, the housing's lower part is not fully screwed onto the outer screw thread of the housing's upper part, but rather, an area of the outer screw thread, which is not covered, remains, which when a shorter vacuum insert is incorporated, can be used for mounting the same.

In the case of the known embodiment, the cover ring measures the same in diameter as the housing's upper part. It is screwed up to the end of the screw thread, against the shoulder, present at this place and is so broad in measurement that it covers the unused area of the outer screw thread and also the upper edge of the housing's lower part, by a certain amount.

The known embodiment is indeed fitted in the best possible way to cover the unused area of the outer screw thread; however, it is relatively expensive because the cover ring must be manufactured, stored and assembled as an additional construction part, whereby the manufacturing costs for the insulating container are increased.

OBJECT OF THE INVENTION

The object of the invention is to simplify the insulating container of the type of construction in question, whilst maintaining the covering of the unused area of the outer screw thread, to the effect that the insulating container can be manufactured at a lower price.

SUMMARY OF THE INVENTION

This object is achieved through the characterising feature of claim 1.

In the case of the design according to the invention, the cover ring is formed by a one-piece extension of the edge of the housing's lower part, so that a separate construction part, as is present in the case of the prior art, is not required. Merely the housing's upper part and the housing's lower part are present, in which case—in the screwed on state—the edge of the housing's lower part extends beyond the end of the outer screw thread or beyond the shoulder arranged at the end of the outer screw thread and, roughly closing, surrounds the casing surface of the housing's upper part. In the case of the design according to the invention, the problem in question, namely the covering of the unused area of the outer screw thread, whilst avoiding an additional construction part, is solved. The gripping over of the casing surface of the housing's upper part does indeed lead to the fact that at least the area of the edge of the housing's lower part, which overlaps the casing surface of the housing's upper part, measures more in diameter than the casing of the housing's upper part. This is, however, for practical purposes, completely insignificant because it does not disturb the handling of the insulating container. Neither is the look of the insulating container impaired because the cover ring appears as a step in the casing surface of the housing.

The designs according to claims 2 to 4 relate to improving the previously mentioned step, namely by a bevelling or tapering of the edge of the housing's lower part, forming the step. By reason of this design the step cannot be disturbingly felt during handling. Moreover, an improvement in the look of the insulating container can be seen in this design.

In the case of the design according to the invention as well, it is guaranteed that the housing's upper part can be manufactured as a blow-moulded plastics part which, as is known, is only possible if special shapings as, in this case, the previously described or further outer screw threads as well, are arranged on the outer side of the blow-moulded plastics part. The design according to the invention is, however, also advantageous, if the housing's upper part is formed by an injected plastics part, which is usual in the case of insulating jugs. Naturally, the design according to the invention is also advantageous in the same way if the housing's upper part consists of metal.

BRIEF DESCRIPTION OF THE DRAWING

In the following an exemplary embodiment of the invention is described, supported by a simplified drawing.

Figure 1:
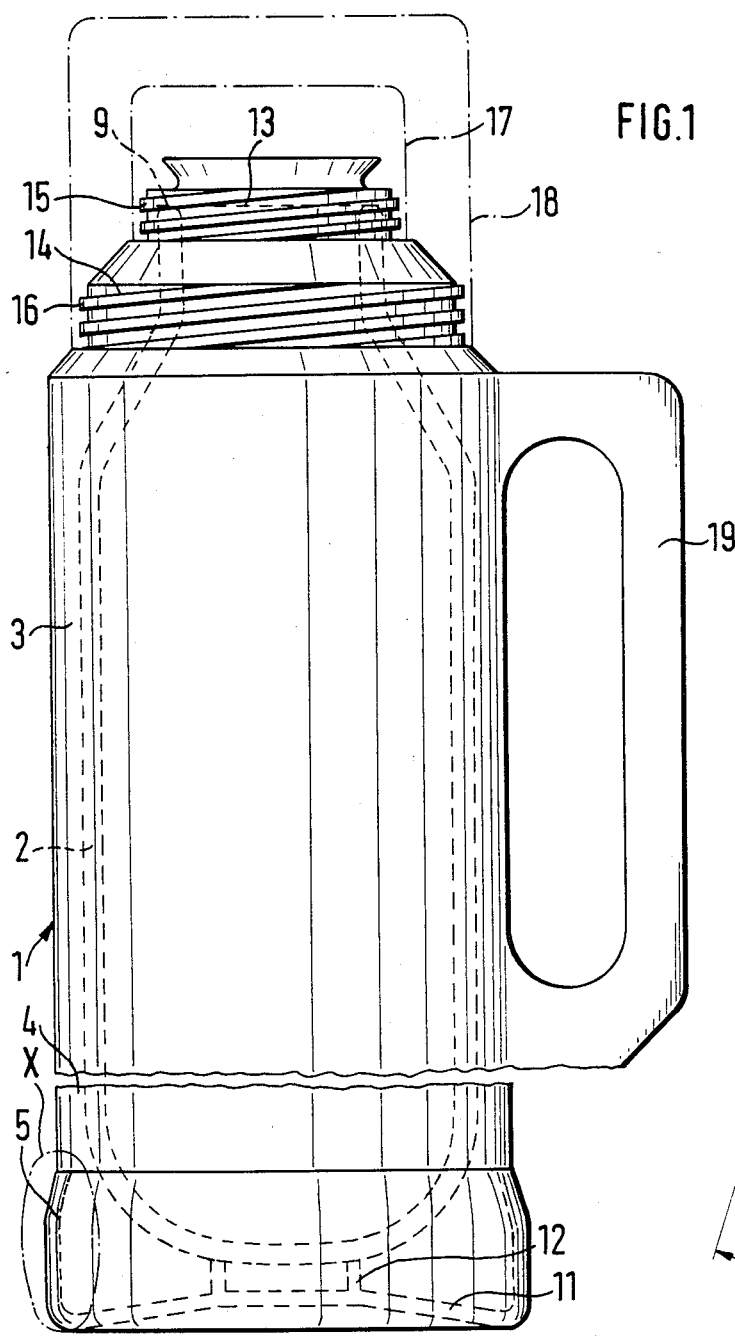
FIG. 1 shows an insulating flask, designed according to the invention, in side view.
Figure 2:
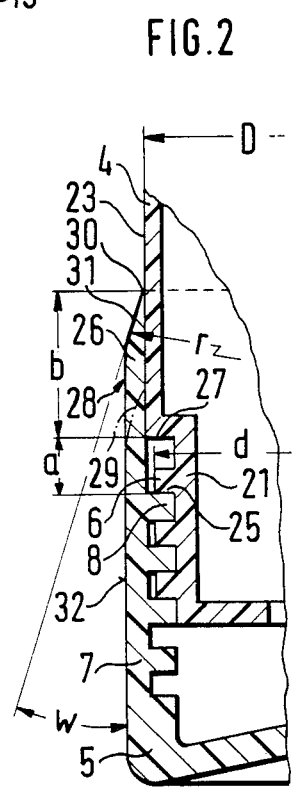
FIG. 2 shows, enlarged, a perpendicular partial section at the place marked with an X in FIG. 1.

The insulating flask generally designated 1 in FIG. 1 consists, in a known manner, of a vacuum glass insert 2 which is surrounded by a housing 3, consisting of plastics material and is held between an upper part 4 of the housing and a lower part 5 of the housing, which are screwed together, in which case the housing's upper part has an outer screw thread 6 and the housing's lower part, on its raised-up edge 7, has an inner screw thread 8 (FIG. 2).

The mounting of the vacuum glass insert 2 ensues between a shoulder 9 in the upper area of the housing's upper part 4 and a base 11 of the housing's lower part 5, which is ingoing and has a concentric thrust piece 12.

The insulating flask 1 has, in addition, in its upper area, a two-stepped arrangement, extending axially, whose sections 13, 14, are of different diameters, and each carry an outer screw thread 15, 16 respectively. A sealing stopper 17, portrayed only in outline, is screwed onto the outer screw thread 15 and a cap 18, in the form of a drinking beaker, likewise portrayed in outline, is screwed onto the outer screw thread 16. The insulating bottle 1 also has a handle 19 which is formed in one piece on the housing's upper part 4. The housing's upper part 4 is a blow-moulded plastics part which is blow-moulded with the handle 19, in one operation. In the case of the housing's lower part 5, it is a question of a plastics pressure moulded or injection moulded part.

In FIG. 2 it can be clearly seen that the outer screw thread 6 is arranged in the area of the housing fastening, on a section 21 of the housing's upper part 4, which is reduced in diameter, whereby the outer diameter d of the outer screw thread 6 measures slightly less than the outer diameter D of the casing 23 of the housing's upper part 4. The edge 7 of the housing's lower part 5 is extended beyond the end of its inner screw thread 8 (at 25). The edge extension, denoted by the number 26, also extends beyond the shoulder 27, formed by the reduction in diameter of the housing's upper part and, roughly closingly, surrounds the casing 23.

The edge extension 26 thus forms a cover ring, generally denoted with the number 28, which covers not only the unused area a of the outer screw thread 6, but also the casing 23 of the housing's upper part 4, by an amount b which measures so much that, in the case of the insertion of a vacuum glass insert 2, relatively long in the range of tolerance, a covering, all be it slight, of the casing 23 through the cover ring 28, is guaranteed. In the case of the insertion of a vacuum glass insert 2, relatively short in the range of tolerance, the housing's lower part 5 can be screwed on further, by the maximum amount a, until the vacuum glass insert 2 comes into position on the base 11.

In FIG. 2 there is shown in dot-dash outline 29 the position the cover ring 28 takes up, if a vacuum glass insert 2, relatively long in the tolerance range, is inserted.

The cover ring 28 is conically tapered, on the outer side, towards its free front end 30, whereby the stepping of the housing's outer surface is improved. In this improvement of the stepping, an improvement in the look of the insulating flask 1 can be seen. The taper 31 is also recommended for avoiding a butt-edge, which it might be possible to feel when handling the insulating bottle 1.

The taper 31 is formed by a cylindrical surface, whose radius r amounts to about 40 mm and which tapers off, whilst avoiding an edge, into the casing surface 32 of the housing's lower part 5. The lip angle w at the base of the taper 31 amounts to about 10°.

What is claimed is:

1. In an insulating container, in particular an insulating flask, with a vacuum glass insert and a hollow cylindrical housing surrounding the latter, which housing consists basically of an upper housing part and a lower housing part, in the form of a base with a raised-up edge and at least one supporting means for the arrangement and mounting of the vacuum glass insert, wherein the upper housing part and the edge of the base are provided with a screw thread and are screwed together until the supporting means is arranged on the vacuum glass insert, wherein the upper housing part has an outer screw thread and the inner screw thread is formed on the edge of the base and wherein a cover ring is provided, which covers an unused area of the outer screw thread; the improvement comprising in that the cover ring is formed by a single-piece extension of the edge of the base, the cover ring overlaps the upper housing part beyond the outer screw thread, the covering being internally dimensioned so as to roughly closely surround the upper part of the housing, and the free end of the cover ring converges conically into the housing wall.

2. An insulating container according to claim 1, characterised in that the taper is formed by a cylindrical surface which tapers off, whilst avoiding an edge, into the casing surface of the housing's lower part.

3. An insulating container according to claim 1, characterised in that the lip angle of the taper amounts to about 10°.

* * * * *